US012402550B2

(12) United States Patent
Ono et al.

(10) Patent No.: US 12,402,550 B2
(45) Date of Patent: Sep. 2, 2025

(54) WORK MACHINE

(71) Applicant: Kubota Corporation, Osaka (JP)

(72) Inventors: Kohei Ono, Sakai (JP); Masahiro Yamada, Sakai (JP)

(73) Assignee: Kubota Corporation, Osaka (JP)

(*) Notice: Subject to any disclaimer, the term of this patent is extended or adjusted under 35 U.S.C. 154(b) by 0 days.

(21) Appl. No.: 18/771,023

(22) Filed: Jul. 12, 2024

(65) Prior Publication Data
US 2025/0017124 A1 Jan. 16, 2025

(30) Foreign Application Priority Data

Jul. 13, 2023 (JP) .................. 2023-115036

(51) Int. Cl.
A01B 63/10 (2006.01)
A01B 63/102 (2006.01)
A01B 63/108 (2006.01)
E02F 9/20 (2006.01)
E02F 9/22 (2006.01)
F15B 15/18 (2006.01)

(52) U.S. Cl.
CPC ........ A01B 63/108 (2013.01); A01B 63/1013 (2013.01); A01B 63/102 (2013.01); E02F 9/2004 (2013.01); E02F 9/2203 (2013.01); F15B 15/18 (2013.01); F15B 2211/63 (2013.01)

(58) Field of Classification Search
CPC .. E02F 9/2004; E02F 9/2246; A01B 63/1013; A01B 63/108
See application file for complete search history.

(56) References Cited

U.S. PATENT DOCUMENTS

| 6,820,567 | B1* | 11/2004 | Kishi | B63H 25/22 440/61 S |
| 2009/0125191 | A1* | 5/2009 | Kurata | B62D 5/064 701/42 |
| 2014/0148984 | A1* | 5/2014 | Nishi | B60W 20/10 180/65.265 |
| 2022/0381006 | A1 | 12/2022 | Patel et al. | |

FOREIGN PATENT DOCUMENTS

JP 2013203377 A 10/2013

* cited by examiner

Primary Examiner — Abiy Teka
(74) Attorney, Agent, or Firm — The Webb Law Firm

(57) ABSTRACT

A work machine according to the present invention includes a manual operating tool configured to operate a hydraulic actuator; an operation amount detector configured to detect an operation amount of the manual operating tool; a hydraulic pump configured to generate a hydraulic pressure to be supplied to the hydraulic actuator; an electric pump motor configured to change an output characteristic of the hydraulic pump in response to a rotary force to be given to the hydraulic pump; a motor load detector configured to detect a motor load of the pump motor; and a pump motor controller configured to determine a necessary output characteristic based on the operation amount and the motor load and control the pump motor based on the output characteristic.

6 Claims, 5 Drawing Sheets

WORK MACHINE

CROSS-REFERENCE TO RELATED APPLICATION

This application claims priority to Japanese Patent Application No. 2023-115036 filed Jul. 13, 2023, the disclosure of which is hereby incorporated by reference in its entirety.

BACKGROUND OF THE INVENTION

1. Field of the Invention

The present invention relates to a work machine including a hydraulic actuator and a hydraulic pump driven by an electric pump motor.

2. Description of Related Art

A vehicle according to Japanese Unexamined Patent Application Publication No. 2013-203377 (Patent Literature 1) includes: a hydraulic fixture including an electric hydraulic pump configured to supply a hydraulic pressure to a hydraulic actuator; an operation amount detector configured to detect an operation amount for the hydraulic fixture which operation amount is given by an operating tool; a pump rotation speed calculator configured to receive the operation amount as an input parameter and calculate a pump rotation speed for the electric hydraulic pump which pump rotation speed is necessary for the hydraulic pressure to be supplied to the hydraulic actuator; and a hydraulic pump controller configured to output a control signal to the electric hydraulic pump so that the electric hydraulic pump is driven at the pump rotation speed calculated by the pump rotation number calculation unit. In a hydraulic pump control in this vehicle, a pump rotation speed for the electric hydraulic pump which pump rotation speed should satisfy a necessary hydraulic pressure is calculated based on the operation amount of the operating tool for the hydraulic fixture, and the electric hydraulic pump is controlled to be driven with the calculated pump rotation speed being taken as a target.

Patent Literature 1: Japanese Unexamined Patent Application Publication No. 2013-203377

SUMMARY OF THE INVENTION

In the hydraulic pump control according to Patent Literature 1, the input parameter for the control is only the operation amount for an operator to operate the operating tool, and therefore, in a case where the operator performs an inappropriate operation, a drive control on the hydraulic pump may become inappropriate.

In view of such circumstances, an object of the present invention is to provide a work machine that performs a drive control on a hydraulic pump more appropriately.

A work machine according to the present invention includes: a hydraulic actuator; a manual operating tool configured to operate the hydraulic actuator; an operation amount detector configured to detect an operation amount of the manual operating tool; a hydraulic pump configured to generate a hydraulic pressure to be supplied to the hydraulic actuator; an electric pump motor configured to change an output characteristic of the hydraulic pump in response to a rotary force to be given to the hydraulic pump; a motor load detector configured to detect a motor load of the pump motor; and a pump motor controller configured to determine a necessary output characteristic based on the operation amount and the motor load and control the pump motor based on the output characteristic.

In this configuration, the hydraulic pump is controlled to be driven based on the output characteristic necessary for the hydraulic pump which output characteristic is calculated based on the operation amount of the manual operating tool and the motor load of the pump motor configured to give a rotary force to the hydraulic pump. This avoids inefficient drive that can occur when the hydraulic pump is driven only depending on the operation by an operator. The restriction on the inefficient drive of the hydraulic pump also contributes to energy saving and noise reduction. At the same time, the motor load of the pump motor is also taken into consideration in the drive control of the hydraulic pump, thereby also restraining the hydraulic pump from being excessively driven due to an inappropriate manual operation.

A work machine according to the present invention includes: a hydraulic actuator; a manual operating tool configured to operate the hydraulic actuator; an operation amount detector configured to detect an operation amount of the manual operating tool; a hydraulic pump configured to generate a hydraulic pressure to be supplied to the hydraulic actuator; an electric pump motor configured to change an output characteristic of the hydraulic pump in response to a rotary force to be given to the hydraulic pump; a workload estimator configured to estimate a workload of the hydraulic actuator based on the operation amount; and a pump motor controller configured to determine the output characteristic based on the operation amount and the workload and control the pump motor based on the output characteristic.

In this configuration, the hydraulic pump is controlled to be driven based on the output characteristic of the hydraulic pump which output characteristic is calculated based on the operation amount of the manual operating tool and the motor load of the pump motor configured to give a rotary force to the hydraulic pump. This avoids inefficient drive that can occur when the hydraulic pump is driven only depending on the operation by an operator. The restriction on the inefficient drive of the hydraulic pump also contributes to energy saving and noise reduction. Furthermore, the workload (the workload also includes a workload of a work device operated by the hydraulic actuator) of the hydraulic actuator that operates in response to the operation amount of the manual operating tool is also taken into consideration in the drive control of the hydraulic pump, so that the hydraulic pressure of an appropriate output characteristic necessary for the operation of the hydraulic actuator is generated, thereby achieving an efficient drive control of the hydraulic pump.

In the present invention, it is also suggested that the output characteristic is either a discharge amount or a discharge pressure, or both the discharge amount and the discharge pressure. A movement required for the work device operated by the hydraulic actuator varies depending on the type of the work device. Accordingly, as the output characteristic required for the hydraulic pump, the selection of whether the discharge amount is given priority to, the discharge pressure is given priority to, or both of them are given priority to is performed appropriately based on a movement required for a work device to be used, so that a more appropriate drive control for the hydraulic pump is enabled.

In the present invention, it is also suggested that the hydraulic actuator is a hydraulic cylinder (a bucket cylinder, a boom cylinder, or the like) configured to lift and lower a bucket or a work device as a lifted and lowered object, and the workload estimator estimates a large workload for a lifting operation to lift the lifted and lowered object and estimates a small workload for a lowering operation to lower the lifted and lowered object. In a case where the lifted and lowered object operated by the hydraulic actuator is a bucket of a bucket loader, a workload at the time when the bucket in a loaded state is lifted against the gravity, a workload at the time when the bucket in a loaded state is lowered along the gravity, a workload at the time when the bucket in an unloaded state is lifted against the gravity, and a workload at the time when the bucket in an unloaded state is lowered along the gravity are different from each other. Such a workload is estimated and the pump motor is controlled in response to the output characteristic determined based on the estimated workload and the operation amount, so that a more appropriate drive control can be performed on the hydraulic pump. Similarly, even in a case where the lifted and lowered object is a work device such as a cultivator that is lifted and lowered by a lifting and lowering cylinder, a workload at the time when the work device is lifted and a workload at the time when the work device is lowered are different from each other. Accordingly, such a workload is estimated and the pump motor is controlled based on the output characteristic determined based on the estimated workload and the operation amount, so that a more appropriate drive control can be performed on the hydraulic pump.

DESCRIPTION OF THE INVENTION

An embodiment to carry out the present invention will be described with reference to the drawings. Note that, in the following description, a direction of an arrow U in FIGS. 1, 2, 3 indicates an "upper side," a direction of an arrow D indicates a "lower side," a direction of an arrow F in FIGS. 1, 3 indicates a "front side," a direction of an arrow B indicates a "rear side," a direction of an arrow R in FIG. 2 indicates a "right side," and a direction of an arrow L indicates a "left side," unless otherwise specified.

Figure 1:
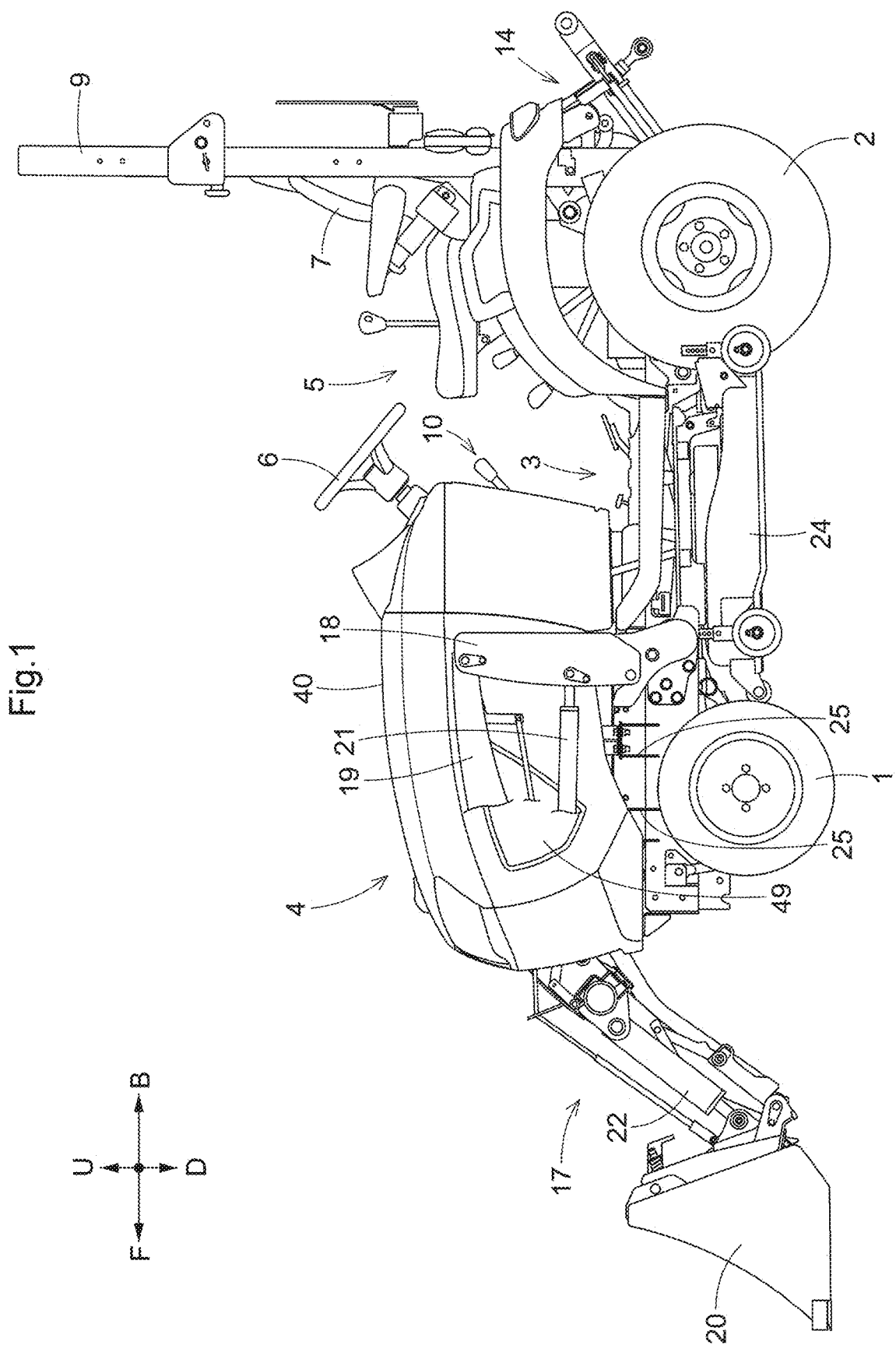
FIG. 1 is a left side view of a tractor.
Figure 2:
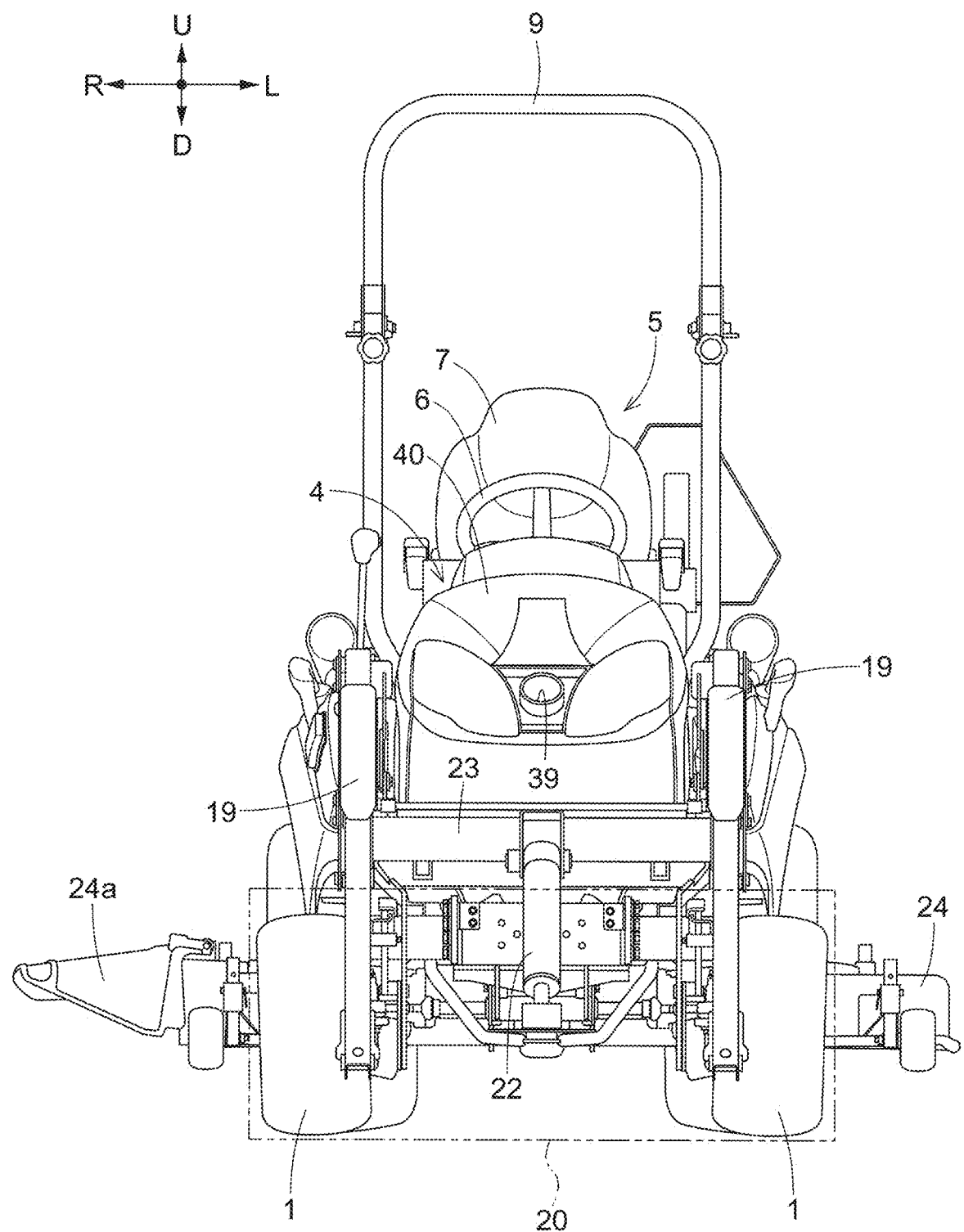
FIG. 2 is a front view of the tractor.
Figure 3:
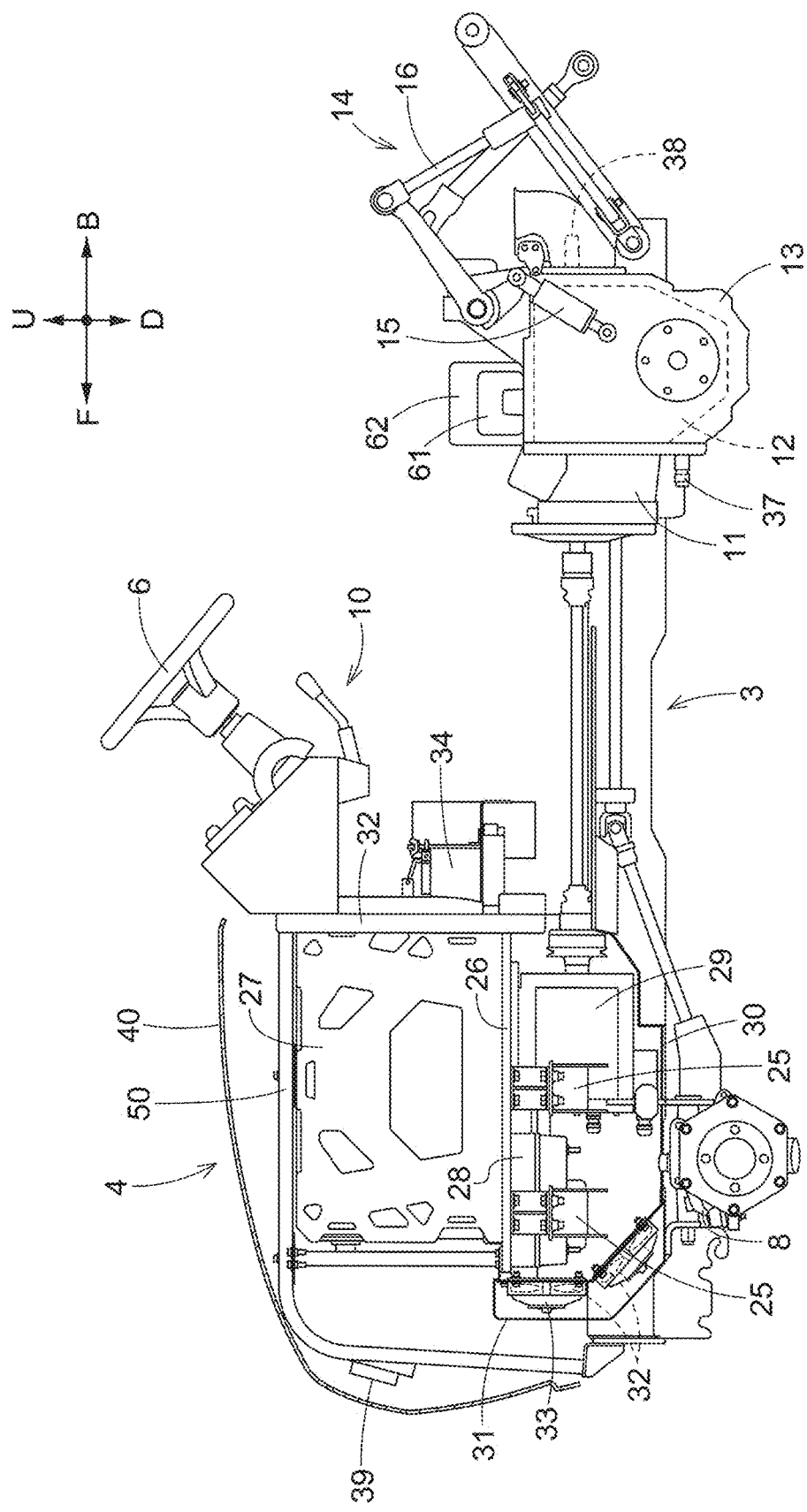
FIG. 3 is a vertical-section left side view illustrating the arrangement of constituents of a power system.

With reference to FIGS. 1, 2, 3, a work machine according to this embodiment will be described. The work machine includes right and left front wheels 1 and right and left rear wheels 2 that are attached to a body 3. The work machine includes a bonnet 4 provided in a front portion of the body 3, and a driving section 5 provided in a rear portion of the body 3. The driving section 5 includes a control lever 6 configured to steer the front wheels 1, a driver seat 7, and a ROPS frame 9. A plurality of manual operating tools 10 for operating a work device provided in the work machine is disposed around the control lever 6.

The body 3 illustrated in FIGS. 1, 3 is a frame structure. As illustrated in FIG. 3, the work machine includes a transmission 12 attached to the rear portion of the body 3 and including a continuously variable transmission 11, and a front axle case 8 attached to the front portion of the body 3. The front wheels 1 are supported on the front axle case 8, and the rear wheels 2 are supported on a transmission case 13 storing the transmission 12.

As illustrated in FIG. 3, a lifting and lowering link mechanism 14 is connected to a rear portion of the transmission case 13 in such a manner as to be vertically swingable. Various work devices (not illustrated) can be attached to the lifting and lowering link mechanism 14. When the lifting and lowering link mechanism 14 is operated to swing vertically by a lifting and lowering cylinder 15, a work device attached thereto is lifted and lowered. A hydraulic pump 61 and a pump motor 62 configured to drive the hydraulic pump 61 are attached to an upper portion of the transmission case 13. The pump motor 62 is an electric motor. The lifting and lowering cylinder 15 performs the lifting and lowering operation based on a hydraulic oil from the hydraulic pump 61 as a drive source.

As illustrated in FIGS. 1, 2, a front loader 17 as one of the work devices is attached to the front portion of the body 3. The front loader 17 includes a base 18, a boom 19, a bucket 20, a hydraulic boom cylinder 21, a bucket cylinder 22, and so on. The boom 19 is lifted and lowered by the boom cylinder 21, and the bucket cylinder 22 causes the bucket 20 to perform a scoop operation and a dump operation. The hydraulic oil from the hydraulic pump 61 is supplied to the boom cylinder 21 and the bucket cylinder 22. The hydraulic oil from the hydraulic pump 61 is also supplied to a lift cylinder (not illustrated) configured to swing the lift arm 16.

A hydraulic actuator OA such as the lifting and lowering cylinder 15, the boom cylinder 21, or the bucket cylinder 22 works based on the operation of the manual operating tool 10.

As illustrated in FIGS. 1, 2, a mower deck 24 is attached to the body 3 in such a manner as to be liftable and lowerable and is disposed between the front wheels 1 and the rear wheels 2.

The mower deck 24 is configured such that three rotating blades (not illustrated) driven to rotate around an axial center along the up-down direction are disposed inside the mower deck 24 to be arranged along the right-left direction, so that grass mowed by the rotating blades is ejected rightward from a right ejection section 25 of the mower deck 24.

As illustrated in FIG. 3, the front portion of the body 3 includes a drive battery 27, an inverter 28, an electric motor 29, a cooling fan 32, a fan motor 33, and an electric equipment battery 34. The drive battery 27 is stored in the bonnet 4. The inverter 28 and the electric motor 29 are disposed below the drive battery 27. A lower cover 30 is provided below the inverter 28 and the electric motor 29 in such a manner as to cover the inverter 28 and the electric motor 29.

As illustrated in FIG. 3, power from the electric motor 29 is transmitted to the continuously variable transmission 11 via a transmission shaft. The continuously variable transmission 11 is configured as a hydrostatic continuously variable transmission and can continuously shift power to a forward side and a reverse side.

The power shifted by the continuously variable transmission 11 is transmitted to the rear wheels 2 via a sub-transmission (not illustrated) and a rear-wheel differential device (not illustrated) provided inside the transmission 12. Power branching right before the rear-wheel differential device is transmitted, via a transmission shaft, to a front-wheel differential device (not illustrated) provided inside the front axle case 8 and then transmitted to the front wheels 1 via the front-wheel differential device.

A front PTO shaft 37 is provided on a lower side of a front portion of the transmission 12 such that the front PTO shaft 37 faces forward, and a rear PTO shaft 38 is provided in a rear portion of the transmission 12 such that the rear PTO shaft 38 faces rearward. In the power transmitted via the transmission shaft, power not shifted by the continuously variable transmission 11 is transmitted to the front PTO shaft 37 and the rear PTO shaft 38.

Power from the front PTO shaft 37 is transmitted to the mower deck 24 via a transmission shaft (not illustrated). Power from the rear PTO shaft 38 is transmitted to a work device attached to the lifting and lowering link mechanism 14 via a transmission shaft (not illustrated).

The cooling fan 32 and the fan motor 33 are integrated and attached to a front portion of the lower cover 30. A dust proofing net as a dust proofing tool 31 is attached to a region of the lower cover 30 which region faces the cooling fan 32. Due to a suction force of the cooling fan 32, external air as cooler wind is introduced into the lower cover 30 through the dust proofing tool 31. Due to the introduced cooler wind, the inverter 28 and the electric motor 29 are cooled.

Figure 4:
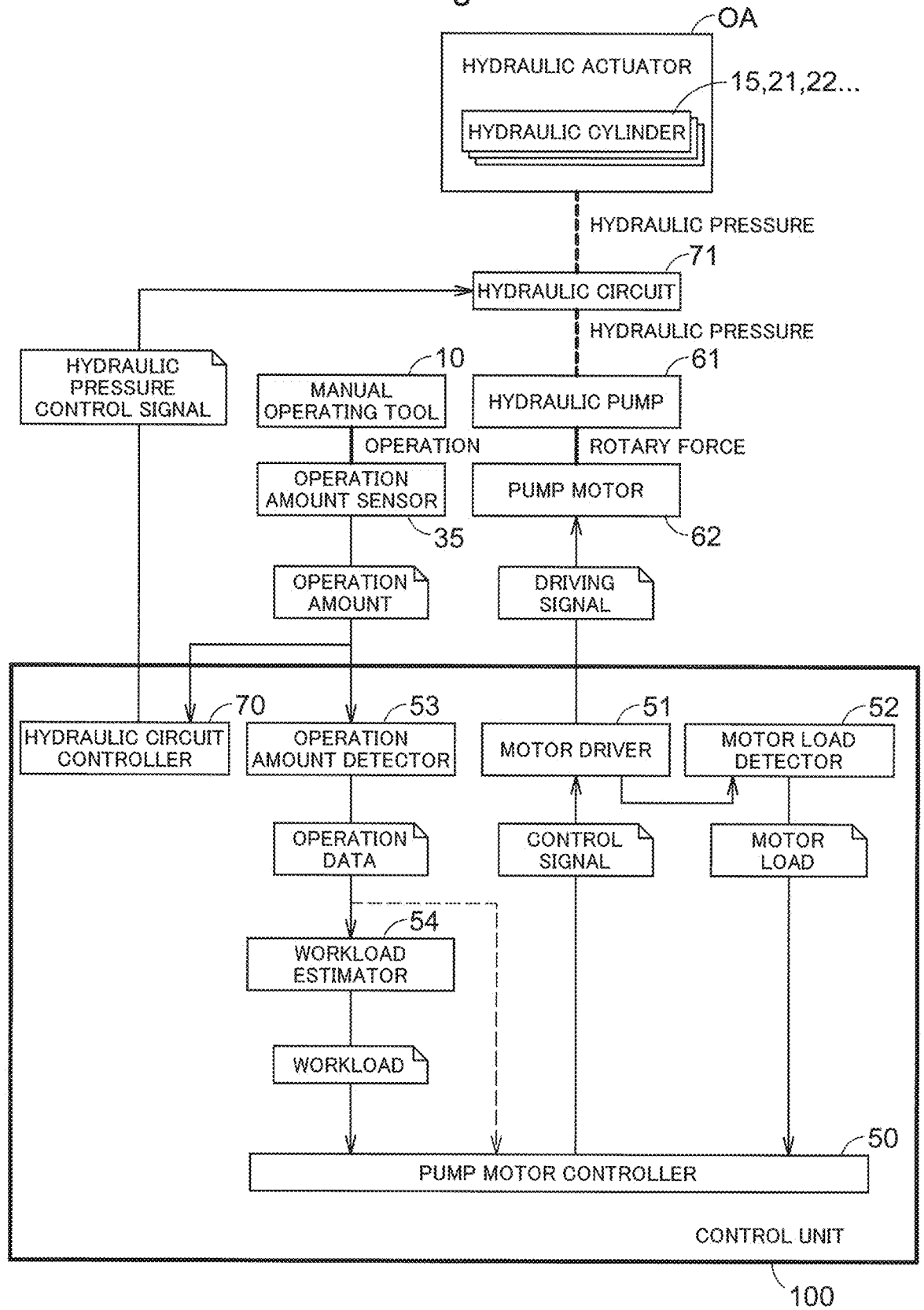
FIG. 4 is a functional block diagram of a control system of a pump motor configured to drive a hydraulic pump.

FIG. 4 illustrates a control functional block to control the pump motor 62 configured to provide a rotary force to the hydraulic pump 61 configured to generate a hydraulic pressure as the drive source for the hydraulic actuator OA. Here, a hydraulic cylinder constituting the hydraulic actuator OA, e.g., the lifting and lowering cylinder 15, the boom cylinder 21, or the bucket cylinder 22, works in response to the operation of the manual operating tool 10. The operation of the manual operating tool 10 is detected by an operation amount sensor 35. The hydraulic pressure to be supplied to the hydraulic actuator OA is generated by the hydraulic pump 61. The hydraulic pump 61 receives a rotary force to generate a hydraulic pressure from the pump motor 62.

A core element in the control functional block illustrated in FIG. 4 is a control unit 100 constituted by a computer base. The control unit 100 in this embodiment includes a pump motor controller 50, a motor driver 51, a motor load detector 52, an operation amount detector 53, a workload estimator 54, and a hydraulic circuit controller 70.

The motor driver 51 gives a driving signal to the pump motor 62 and rotates the pump motor 62. The motor load detector 52 receives a status signal indicative of a driving state of the motor driver 51 and detects a motor load of the pump motor 62 based on the status signal. Of course, the motor load detector 52 can detect the motor load based on an electrical signal acquired from the pump motor 62.

The operation amount detector 53 generates operation data indicative of the operation behavior of the manual operating tool 10 based on an operation amount (a signal or data) from the operation amount sensor 35 configured to detect the operation of the manual operating tool 10. The operation data thus generated is given to a functional section that requires this operation data. The operation data includes at least one of the operation displacement, the operation position, the operation direction, and the operation speed of each hydraulic operating tool constituting the manual operating tool 10.

The pump motor controller 50 determines an output characteristic required for the hydraulic pump 61 based on the operation amount of the manual operating tool 10, more specifically, the operation data received from the operation amount detector 53 and the motor load received from motor load detector 52. Further, the pump motor controller 50 generates a control signal for driving the pump motor 62 so that the hydraulic pump 61 works with the output characteristic. Note that the output characteristic includes either of or both a discharge amount and a discharge pressure of the hydraulic pump 61.

In this embodiment, the workload estimator 54 configured to estimate a workload required for the hydraulic pump 61 based on the operation data given from the operation amount detector 53 is provided. The workload thus estimated by the workload estimator 54 is given to the pump motor controller 50. That is, the operation amount detector 53 estimates an action (herein referred to as the workload) of the hydraulic pump 61 which action is predictable from the operation of the manual operating tool 10 with time. The pump motor controller 50 calculates the output characteristic (the discharge amount: the flow rate and the discharge pressure: the hydraulic pressure) of the hydraulic pump 61 in consideration of the estimated workload and generates a control signal for the pump motor 62. Hereby, the hydraulic pump 61 is driven appropriately.

In a simple example of the pump motor control in consideration of the workload, in a case where the hydraulic actuator OA is the bucket cylinder 22 or the boom cylinder 21 configured to lift and lower the bucket 20 as an example of a lifted and lowered object, the workload estimator 54 estimates a large workload for a lifting operation (a movement against the gravity) to lift the bucket 20 and estimates a small workload for a lowering operation (a movement helped by the gravity) to lower the bucket 20. Alternatively, the workload estimator 54 can be configured to estimate a larger workload as the carrying capacity of the bucket 20 is larger or as the lifting and lowering speed of the bucket 20 is larger. When the workload thus estimated is taken into consideration as such, the hydraulic pump 61 can achieve an appropriate output characteristic based on the rotation of the pump motor 62. Similarly, even in the lifting and lowering operation of the lifting and lowering cylinder 15 configured to lift and lower a work device (a cultivator, a fertilizer spraying device, or the like (not illustrated herein)) as an example of the lifted and lowered object, the workload estimator 54 estimates a large workload for a lifting operation (a movement against the gravity) of the lifting and lowering cylinder 15 and estimates a small workload for a lowering operation (a movement helped by the gravity) of the lifting and lowering cylinder 15. Hereby, the rotation of the pump motor 62 is controlled appropriately.

Figure 5:
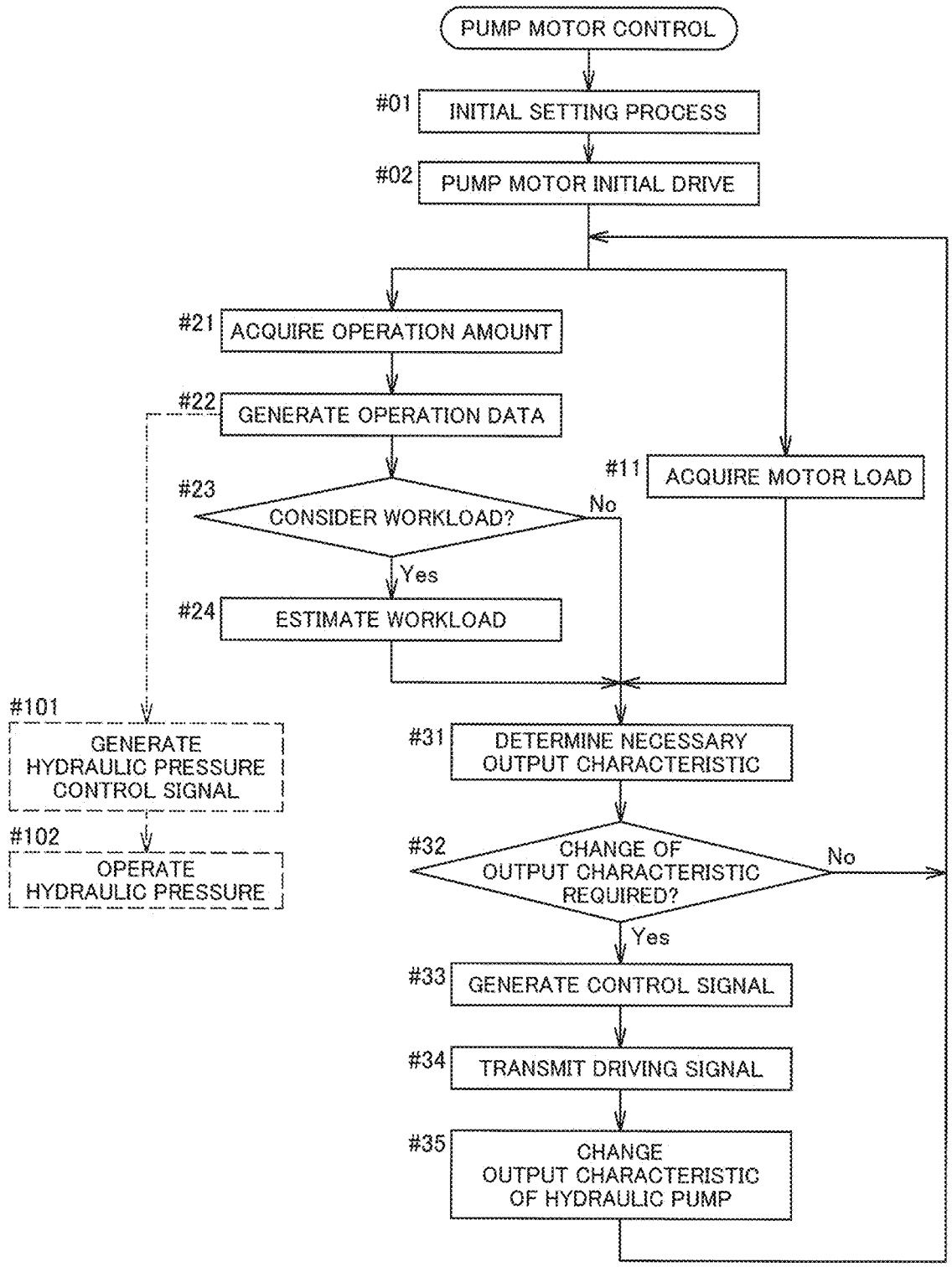
FIG. 5 is a flowchart illustrating an exemplary procedure of a pump motor control for the hydraulic pump.

An example of the pump motor control in the hydraulic control system will be described with reference to the flowchart of FIG. 5.

When the pump motor control is started, an initial setting process is performed (#01). In the initial setting process, a default control signal for the pump motor 62 is generated such that the hydraulic pump 61 is driven with a default output characteristic, and the motor driver 51 gives a driving signal corresponding to this control signal to the pump motor 62, so that the pump motor 62 performs initial drive (#02). As a result, the hydraulic pump 61 performs initial drive with the default output characteristic (default output characteristic drive) (#03).

Subsequently, in order to check whether or not it is necessary to change the default output characteristic, two parameters are acquired. Respective parameter acquisition processes of acquiring the two parameters may be performed independently, and only the results may be stored in a memory. One of the parameter acquisition processes is acquisition of a motor load by the motor load detector 52 (#11).

The other one of the parameter acquisition processes is acquisition of an operation amount detected by the operation amount sensor 35 (#21). The operation amount detector 53 generates operation data that can be handled by a functional section of the control unit 100 from the operation amount thus acquired (#22). In this embodiment, whether a pump motor control in consideration of a workload is performed or not is checked (selected) (#23). This may be set by process setting in advance or may be automatically or manually set based on a working state or the like. When the workload is taken into consideration (Yes in #23), the workload is estimated based on the operation data (#24).

Note that the operation data generated in step #22 is also given to the hydraulic circuit controller 70. The hydraulic circuit controller 70 generates a hydraulic pressure control signal based on the operation data thus given and transmits the hydraulic pressure control signal to a hydraulic circuit (a control valve or the like). Hereby, the hydraulic actuator OA performs an operation corresponding to the operation of the manual operating tool 10.

In a case of Yes in step #23, the workload estimated in step #24 and the motor load are given to the pump motor controller 50 as a parameter for determination of an output characteristic. In a case of No in step #23, the motor load and the operation data are given to the pump motor controller 50 as a parameter for determination of an output characteristic. The pump motor controller 50 determines an output characteristic (a necessary output characteristic) required for the hydraulic pump 61 based on the parameter thus given (#31). The output characteristic is determined by use of a function or a lookup table with the parameter such as a motor load, operation data, or a workload being taken as an explanatory variable and the output characteristic being taken as a response variable.

Then, a difference between the output characteristic thus determined and a currently set output characteristic is found to check whether it is necessary to change the output characteristic (#32). When the difference is small and it is not necessary to change the output characteristic (No in #32), the process returns to step #11 and step #21 to repeat the parameter acquisition process.

When the difference is large and it is necessary to change the output characteristic (Yes in #32), the pump motor 62 is driven such that the hydraulic pump 61 can generate a hydraulic pressure with the output characteristic thus determined. The pump motor controller 50 generates a control signal to drive the pump motor 62 and transmits it to the motor driver 51 (#33). The motor driver 51 gives a driving signal to drive the pump motor 62 based on the received control signal to the pump motor 62 (#34). The rotation of the pump motor 62 in response to the driving signal changes the output characteristic of the hydraulic pump 61 to the output characteristic determined by the pump motor controller 50 (#35).

Alternative Embodiments (1) In the above embodiment, the hydraulic cylinder is used as the hydraulic actuator OA, but a hydraulic motor may be used, or both of them may be used.

(2) The manual operating tool 10 may be constituted by a plurality of levers and buttons or may be constituted by a multifunctional lever configured such that a single lever is operated multidirectionally. In a case where a plurality of operations occurs at the same time, an integrated operation amount to integrate respective operation amounts of the operations may be calculated, and a parameter for determination of an output characteristic may be generated based on the integrated operation amount.

(3) The functional block diagram illustrated in FIG. 4 is drawn for the purpose of description, and a particular functional section (for example, the motor driver 51 or the hydraulic circuit controller 70) may be provided outside the control unit 100. In addition, respective functional sections may be divided or combined freely.

Note that the configurations described in the above embodiment (including the alternative embodiments; the same applies hereinafter) can be applied in combination with configurations of other embodiments as long as no inconsistency occurs. Further, the embodiment disclosed in the present specification is just an example. The embodiment of the present invention is not limited to this, and various modifications can be made within a range that does not deviate from the object of the present invention.

INDUSTRIAL APPLICABILITY

The present invention is not limited to farm equipment such as a tractor and may be also applicable to a civil engineering work machine, a construction work machine, or a stationary work machine.

| Description of the Reference Numerals | |
|---|---|
| 10 | manual operating tool |
| 11 | continuously variable transmission |
| 14 | lifting and lowering link mechanism |
| 15 | lifting and lowering cylinder |
| 16 | lift arm |
| 17 | front loader |
| 19 | boom |
| 20 | bucket |
| 21 | boom cylinder |
| 22 | bucket cylinder |
| 24 | mower deck |
| 27 | drive battery |
| 28 | inverter |
| 29 | electric motor |
| 35 | operation amount sensor |
| 50 | pump motor controller |
| 51 | motor driver |
| 52 | motor load detector |
| 53 | operation amount detector |
| 54 | workload estimator |
| 61 | hydraulic pump |
| 62 | pump motor |
| 70 | hydraulic circuit controller |
| 100 | control unit |
| OA | hydraulic actuator |

What is claimed is:

1. A work machine, comprising:
a hydraulic actuator;
a manual operating tool configured to operate the hydraulic actuator;
an operation amount detector configured to detect an operation amount of the manual operating tool;
a hydraulic pump configured to generate a hydraulic pressure to be supplied to the hydraulic actuator;
an electric pump motor configured to change an output characteristic of the hydraulic pump in response to a rotary force to be given to the hydraulic pump;
a motor load detector configured to detect a motor load of the pump motor;
a pump motor controller configured to determine the output characteristic based on the operation amount and the motor load and control the pump motor based on the output characteristic; and
a workload estimator configured to estimate a workload of the hydraulic actuator based on the operation amount, wherein the pump motor controller determines a necessary output characteristic based on the operation amount and the workload and controls the pump motor based on the output characteristic.

2. The work machine according to claim 1, wherein:
the output characteristic is either a discharge amount or a discharge pressure, or both the discharge amount and the discharge pressure.

3. The work machine according to claim 1, wherein:
the hydraulic actuator is a hydraulic cylinder configured to lift and lower a bucket or a work device as a lifted and lowered object, and
the workload estimator estimates a large workload for a lifting operation to lift the lifted and lowered object and estimates a small workload for a lowering operation to lower the lifted and lowered object.

4. A work machine, comprising:
a hydraulic actuator;
a manual operating tool configured to operate the hydraulic actuator;
an operation amount detector configured to detect an operation amount of the manual operating tool;
a hydraulic pump configured to generate a hydraulic pressure to be supplied to the hydraulic actuator;
an electric pump motor configured to change an output characteristic of the hydraulic pump in response to a rotary force to be given to the hydraulic pump;
a workload estimator configured to estimate a workload of the hydraulic actuator based on the operation amount; and
a pump motor controller configured to determine the output characteristic based on the operation amount and the workload and control the pump motor based on the output characteristic.

5. The work machine according to claim 4, wherein:
the output characteristic is either a discharge amount or a discharge pressure, or both the discharge amount and the discharge pressure.

6. The work machine according to claim 4, wherein:
the hydraulic actuator is a hydraulic cylinder configured to lift and lower a bucket or a work device as a lifted and lowered object, and
the workload estimator estimates a large workload for a lifting operation to lift the lifted and lowered object and estimates a small workload for a lowering operation to lower the lifted and lowered object.

* * * * *